(12) United States Patent
Takahashi

(10) Patent No.: US 12,455,709 B2
(45) Date of Patent: Oct. 28, 2025

(54) PRINT CONTROL APPARATUS, METHOD FOR CONTROLLING PRINT CONTROL APPARATUS, AND NON-TRANSITORY COMPUTER-READABLE STORAGE MEDIUM STORING PROGRAM

(71) Applicant: CANON KABUSHIKI KAISHA, Tokyo (JP)

(72) Inventor: Miho Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 76 days.

(21) Appl. No.: 18/460,385

(22) Filed: Sep. 1, 2023

(65) Prior Publication Data

US 2024/0078065 A1 Mar. 7, 2024

(30) Foreign Application Priority Data

Sep. 5, 2022 (JP) .................................. 2022-140880

(51) Int. Cl.
*G06F 3/12* (2006.01)
(52) U.S. Cl.
CPC .......... *G06F 3/1258* (2013.01); *G06F 3/1204* (2013.01); *G06F 3/1205* (2013.01)
(58) Field of Classification Search
None
See application file for complete search history.

(56) References Cited

U.S. PATENT DOCUMENTS

| 10,504,014 | B2* | 12/2019 | Kaneda | G06F 3/1203 |
| 10,805,493 | B2* | 10/2020 | Osada | H04N 1/3935 |
| 2015/0234555 | A1* | 8/2015 | Kobayashi | G06F 3/04817 715/777 |
| 2019/0303076 | A1* | 10/2019 | Kato | G06F 3/1254 |
| 2020/0133600 | A1* | 4/2020 | Kanamori | G06F 3/1255 |
| 2021/0240404 | A1* | 8/2021 | Hayashi | G06F 3/1257 |
| 2021/0294882 | A1* | 9/2021 | Shinkawa | H04N 1/00204 |
| 2022/0377189 | A1* | 11/2022 | Ikuma | H04N 1/00509 |
| 2023/0161528 | A1* | 5/2023 | Kim | G06F 3/1254 358/1.15 |

FOREIGN PATENT DOCUMENTS

JP 2007304809 A 11/2007

* cited by examiner

*Primary Examiner* — Helen Zong
(74) *Attorney, Agent, or Firm* — Canon U.S.A., Inc., IP Division

(57) ABSTRACT

A print control apparatus includes at least one memory and at least one processor which function as a display control unit configured to perform control so as to display a setting screen including a plurality of options for a setting item, and a control unit configured to perform first control of finalizing a setting value in response to reception of the selection operation for the option displayed on the setting screen, and second control of finalizing a setting value in response to reception of the selection operation of a specific software key after reception of the selection operation for the option displayed on the setting screen without finalizing the setting value at a time when the selection operation for the option displayed on the setting screen is received.

12 Claims, 12 Drawing Sheets

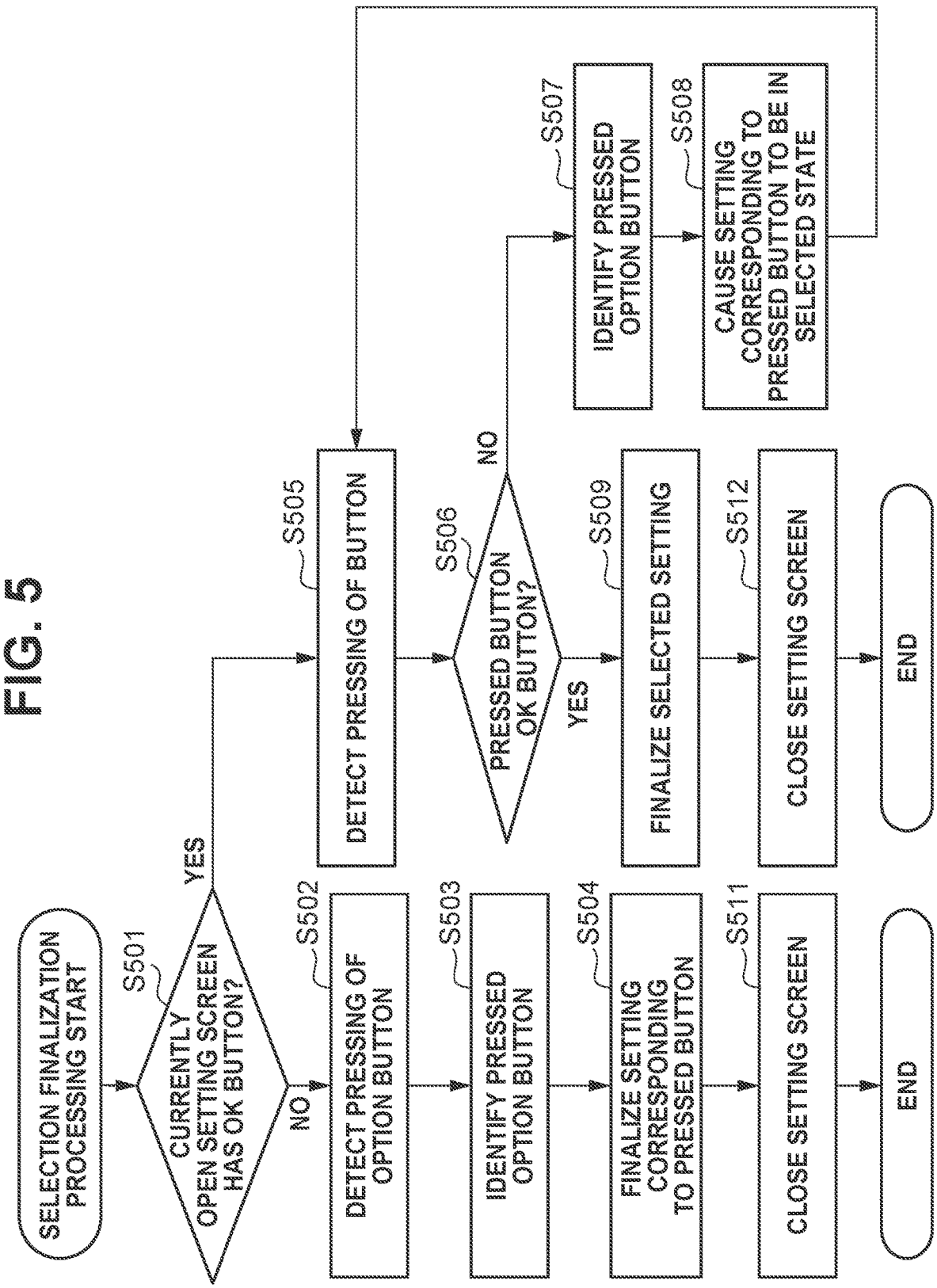

PRINT CONTROL APPARATUS, METHOD FOR CONTROLLING PRINT CONTROL APPARATUS, AND NON-TRANSITORY COMPUTER-READABLE STORAGE MEDIUM STORING PROGRAM

BACKGROUND

Field of the Disclosure

The present disclosure relates to a print control apparatus, a method for controlling a print control apparatus, and a non-transitory computer-readable storage medium storing a program.

Description of the Related Art

In the print control apparatus, setting related to processing is often performed from a setting screen on which a plurality of setting value candidates are displayed. The user selects a desired setting item on the setting screen and finalizes the selection, thereby finalizing the setting.

There is a technique for switching a method of finalizing a selection on such a setting screen according to a situation. Japanese Patent Application Laid-Open No. 2007-304809, for example, discusses switching a selection finalization method, in accordance with a user's degree of proficiency in operation, on a setting screen of an image processing apparatus such as a copying machine or a printer. Specifically, in a case where the beginner mode is selected, the setting is finalized by the user pressing a button for finalizing the selection after pressing an option button. On the other hand, in a case where the expert mode is selected, the setting is finalized by pressing the option button being selected.

SUMMARY

Aspects of the present disclosure provides improved operability of a print control device. According to an aspect of the present disclosure, a print control apparatus includes at least one memory and at least one processor which function as a display control unit configured to perform control so as to display a setting screen including a plurality of options for a setting item, the setting screen being for setting a setting value for the setting item by receiving a selection operation for one of the plurality of options, and a control unit configured to, in a first case, perform first control of finalizing a setting value to be set for a setting item to a setting value corresponding to the option for which the selection operation has been received in response to reception of the selection operation for the option displayed on the setting screen, and, in a second case, perform second control of finalizing a setting value to be set for a setting item to a setting value corresponding to an option for which the selection operation is received in response to reception of the selection operation of a specific software key after reception of the selection operation for the option displayed on the setting screen without finalizing the setting value to be set for the setting item to the setting value corresponding to the option for which the selection operation is received at a time when the selection operation for the option displayed on the setting screen is received.

Further features of the present disclosure will become apparent from the following description of embodiments with reference to the attached drawings.

BRIEF DESCRIPTION OF THE DRAWINGS

FIG. 5 is a flowchart illustrating a process of finalizing a selection.

DESCRIPTION OF THE EMBODIMENTS

Hereinafter, embodiments for carrying out the present disclosure will be described with reference to the drawings.

In a first embodiment, on a setting screen on which it is determined that an OK button for finalizing a setting is not necessary, the setting is finalized by one button operation, and processing related to the setting is started. Note that, in the present embodiment, an operation by which a setting related to processing is finalized and the processing is started, the operation being an operation of one selection button, is referred to as a one button operation. In addition, a method will be described as an example in which a selection is finalized by pressing an OK button on a setting screen, for which it has been determined that the OK button for finalizing the setting is necessary (for example, in the present embodiment, a setting screen on which selection of a plurality of setting values is necessary or a setting screen after pressing a scan start button).

Figure 1:
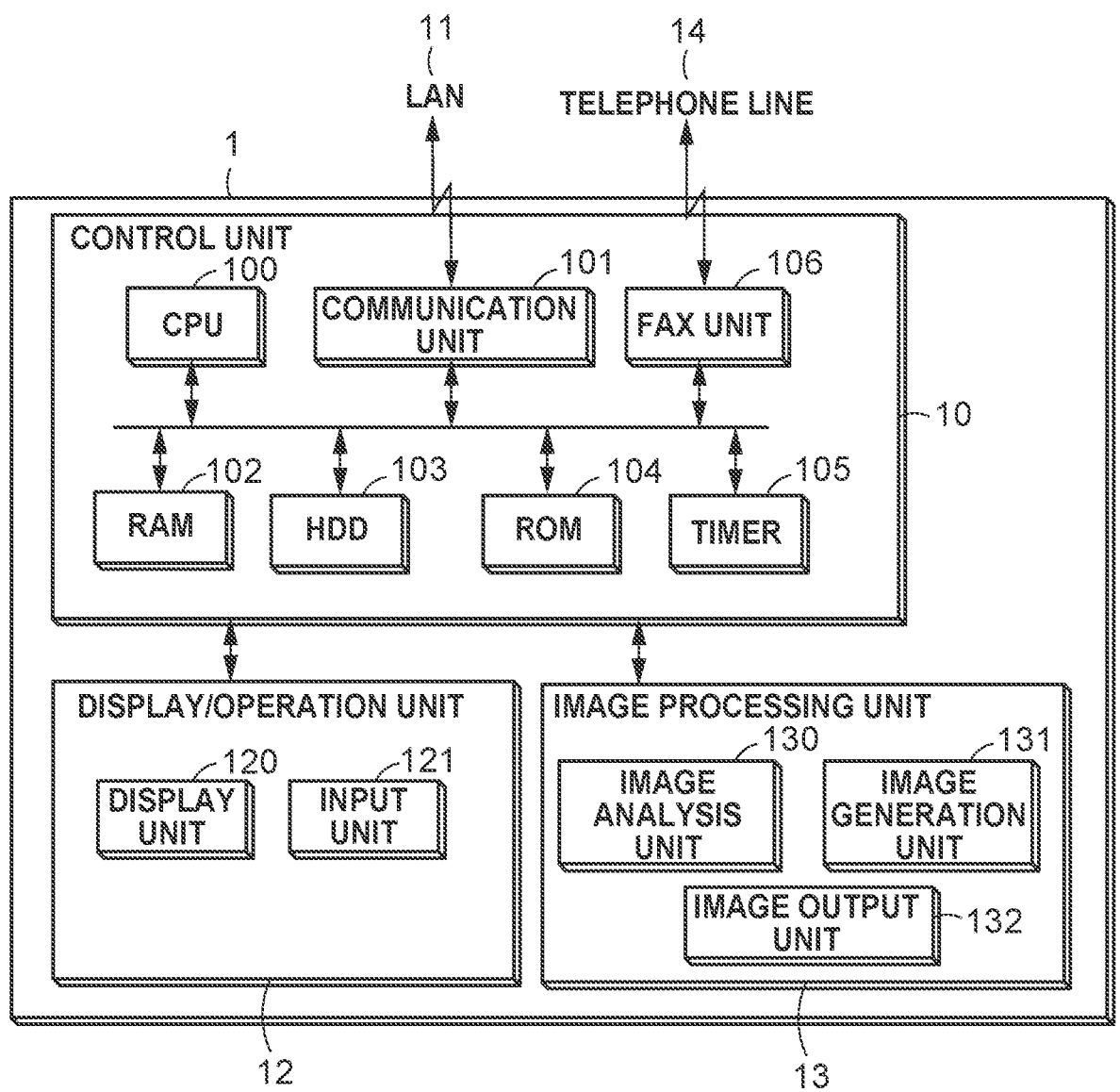
FIG. 1 is a hardware configuration diagram of an image processing apparatus.

FIG. 1 is a block diagram illustrating an example of a hardware configuration of an image processing apparatus according to an embodiment of the present disclosure.

In an image processing apparatus 1 according to the present embodiment, a control unit 10 performs operation control of each unit of the image processing apparatus 1. The control unit 10 includes a central processing unit (CPU) 100, a communication unit 101, a random access memory (RAM) 102, a hard disk drive (HDD) 103, a read-only memory (ROM) 104, a timer 105, and a facsimile (FAX) unit 106.

The CPU 100 has overall control of the control unit 10.

A local area network (LAN) 11 indicates a network for data transmission and reception with an external device, and the image processing apparatus 1 is connected to the Internet via the LAN 11. The communication unit 101 performs data transmission and reception via the LAN 11.

The RAM 102 provides a system work memory for the CPU 100 to operate.

The HDD 103 may be other storage devices such as a magnetic disk, an optical medium, and a flash memory, or a combination thereof. The HDD 103 can store, for example, job data and setting data. In addition, the HDD 103 need not exist in the image processing apparatus 1. For example, an external server or personal computer may be used as the storage device via the communication unit 101.

A ROM 104 is a boot ROM, which stores a system boot program. The CPU 100 loads a program installed in the HDD 103 to the RAM 102 by the boot program of the ROM 104, and performs various controls based on the program.

The timer 105 measures time in accordance with an instruction from the CPU 100, and notifies the CPU 100 by interruption or the like when the instructed time elapses.

The fax unit 106 transmits and receives fax data over a telephone line 14.

A display/operation unit 12 is controlled by the control unit 10 and includes a display unit 120 and an input unit 121.

The display unit 120 is a display for displaying information about the image processing apparatus to a user.

The input unit 121 receives an input from the user via an interface such as a touch panel, a mouse, a camera, a voice input, or a keyboard.

An image processing unit 13 is controlled by the control unit 10 and includes an image analysis unit 130, an image generation unit 131, and an image output unit 132.

The image analysis unit 130 analyzes the structure of a document image and extracts necessary information from an analysis result.

The image generation unit 131 reads (e.g., scans) a document, digitizes an image of the document, generates image data, and stores the image data in the HDD 103. The image generation unit 131 can also generate document image data in another format using the information analyzed by the image analysis unit 130.

The image output unit 132 outputs image data stored in, for example, the HDD 103. Examples of the output method include printing the image data of the document on paper, transmitting the image data to an external device, a server, a facsimile machine, or the like connected to a network via the communication unit 101, and storing the image data in a storage medium connected to the image processing apparatus 1. In other words, the image processing apparatus 1 is also a print control apparatus (printer) capable of controlling the image output unit 132 to print an image.

Figure 2:
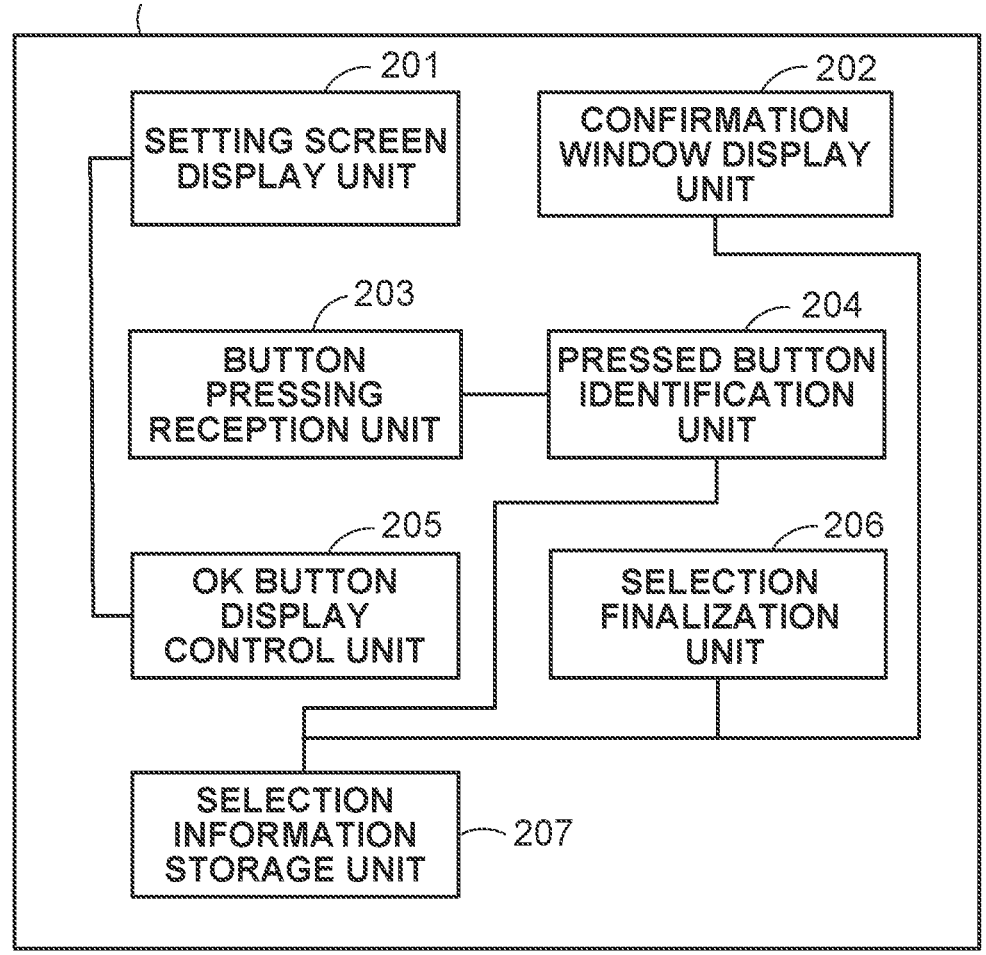
FIG. 2 is a software configuration diagram of an image processing apparatus.

FIG. 2 is a diagram illustrating an example of a software configuration which is a function of the image processing apparatus 1.

The image processing apparatus 1 includes, as its functions, a setting screen display unit 201, a confirmation window display unit 202, a button pressing reception unit 203, a pressed button identification unit 204, an OK button display control unit 205, a selection finalization unit 206, and a selection information storage unit 207. Each of these functional units is implemented by the CPU 100 loading a program installed in the HDD 103 to the RAM 102 using the boot program of the ROM 104 and executing the program.

The setting screen display unit 201 performs a process of displaying the setting screen and a process of closing the setting screen. The setting screen the display of which is controlled by the setting screen display unit 201 corresponds to a setting screen that displays a plurality of setting values for a setting item and sets a setting value for the setting item by receiving a selection operation for a displayed setting value.

The confirmation window display unit 202 displays a window for confirming that the setting screen is to be closed when the user changes the selection on the setting screen and then presses a button for closing the setting screen without finalizing the selection.

The button pressing reception unit 203 detects pressing of a button by the user.

The pressed button identification unit 204 identifies a button pressed by the user and identifies a setting screen associated with the button.

The OK button display control unit 205 determines whether to display an OK button as a button (software key) for confirming the selection on the setting screen.

The selection finalization unit 206 finalizes the selection by an operation of the user on the setting screen.

The selection information storage unit 207 stores an option that is being selected on the setting screen on which the OK button is displayed. At the time of transition to the setting screen, the selection information storage unit 207 has an initial value stored therein.

Hereinafter, display processing of the setting screen will be described with reference to FIG. 3 and FIGS. 4A to 4C, and here, an example of an issue to be addressed by the present embodiment will be described.

On the user interface (UI) screen, it is important to reduce the number of user operations in order to improve usability.

It is conceivable to reduce the number of user operations by hiding a button for finalizing the selection (hereinafter referred to as an "OK button") on the setting screen and finalizing the selection by a selection operation of an option. However, if the OK button on the setting screen is uniformly hidden, the usability may rather decrease depending on the situation.

For example, in a setting screen in which a plurality of selections is required, it is difficult to finalize a selection simply by a selection operation of an option. Therefore, a selection finalization method in which the OK button is pressed after buttons of a plurality of options are pressed is convenient because the selection finalization timing is clear. If the OK button on the setting screen is uniformly hidden, such convenience is lost.

In some cases, when the selection is finalized on the setting screen, a job using the selected setting value is started immediately. This case corresponds to the case where the above-described one button operation is performed. For example, on the screen for setting the size of the scanned document displayed after a scan start operation, the scan job is started in response to the selection of the document size. If the user makes an error in the selection operation on such a setting screen, the job is started with the erroneous setting. In order to cancel the erroneous selection operation, it is necessary to cancel the started scan job, which is rather troublesome.

In this way, in a configuration in which the OK button of the setting screen is not displayed uniformly, usability may be reduced.

The present embodiment aims to solve, for example, the above-described issue. The present embodiment makes it possible to achieve both maintenance of usability and reduction of the number of operations in an operation of a setting screen for selecting one from a plurality of options.

Figure 3:
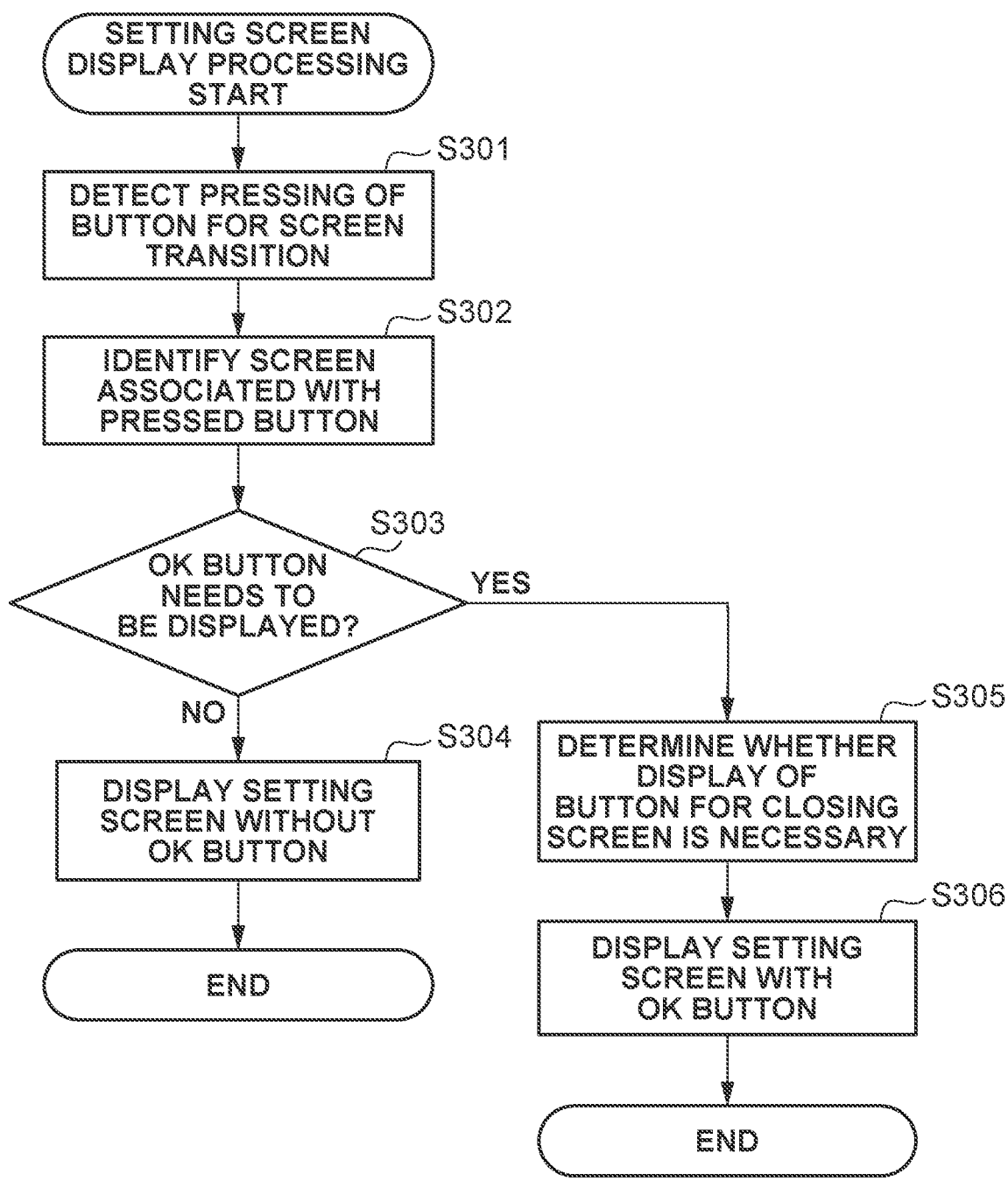
FIG. 3 is a flowchart of a process of displaying a setting screen.

FIG. 3 is a flowchart illustrating an example of a process of displaying a setting screen. Each step of the flowcharts shown in FIG. 3 and FIGS. 5 and 6 to be described below is processed by the CPU 100 of the image processing apparatus 1 executing a program. The program to be executed is called from the ROM 104 and causes each functional unit shown in FIG. 2 to function. In the drawings, "S" indicates a step.

When the button for transitioning to the setting screen is pressed, in step S301, the button pressing reception unit 203 detects pressing of the button.

When the pressing of the button is detected, in step S302, the pressed button identification unit 204 identifies the setting screen associated with the button pressed in step S301.

Next, in step S303, the OK button display control unit 205 determines whether to display the OK button on the setting screen identified in step S302 on the basis of the state or the operation situation of the image processing apparatus 1. This will be specifically described below.

For example, in a setting screen requiring selection of a plurality of setting buttons (a setting screen requiring setting of a plurality of setting values), if there is no OK button, if the selection is finalized by a one button operation and the processing is started, the user cannot set the remaining setting buttons. Therefore, in a case where the setting screen identified in step S302 is a setting screen requiring operations of a plurality of setting buttons, the OK button display control unit 205 determines that "the OK button is necessary" in step S303.

In addition, for example, on the setting screen after the scan start button is pressed, the scan is started when the selection is finalized, and thus it is difficult to change the selection when the selection is made by mistake. As described above, in the setting screen in which the job is started immediately after the option is selected, if the option is selected by mistake, it is necessary to cancel the started job, which increases the time and effort for operation.

Therefore, when the setting screen identified in step S302 is this kind of a setting screen, the OK button display control unit 205 determines that the "OK button is necessary" in step S303.

On the other hand, for example, on a setting screen for selecting one selection button and on which a job is not started immediately after the one selection button is selected, it is possible to reduce the time and effort of operation by finalizing the selection by one button operation. Therefore, when the setting screen identified in step S302 is such a kind of setting screen, the OK button display control unit 205 determines that "the OK button is not necessary" in step S303.

Based on the determination result in step S303, the setting screen display unit 201 switches between display and non-display of the OK button depending on the situation even on the screen on which the same setting is performed. Specifically, in a case where it is determined that the OK button is not necessary in the identified setting screen (NO in step S303), the setting screen display unit 201 displays the identified setting screen as a setting screen in which the OK button is not displayed in step S304.

On the other hand, in a case where it is determined that the OK button is necessary in the identified setting screen (YES in step S303), first, in step S305, the setting screen display unit 201 determines whether a button for closing the setting screen is necessary. In the determination of step S305, for example, it may be determined that "a close button is required" for a screen requiring an OK button. In addition, since it is necessary to select a reading size in order to execute scanning on the setting screen after the scan start button is pressed, it may be determined that "the close button is unnecessary".

Next, in step S306, the setting screen display unit 201 displays the identified setting screen as a setting screen with an OK button based on the determination result of step S303. At this time, the setting screen display unit 201 controls the display of the close button on the setting screen based on the determination result of step S305.

Figure 4A:
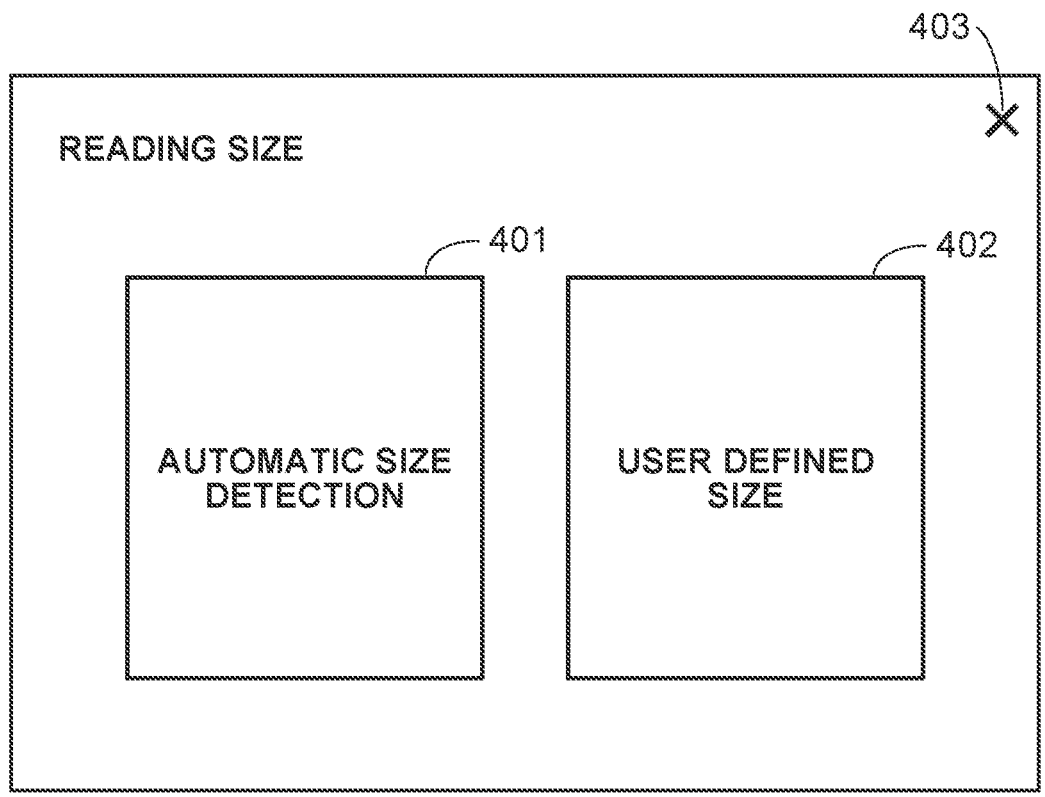
FIGS. 4A, 4B, and 4C are display examples of a setting screen.
Figure 4B:
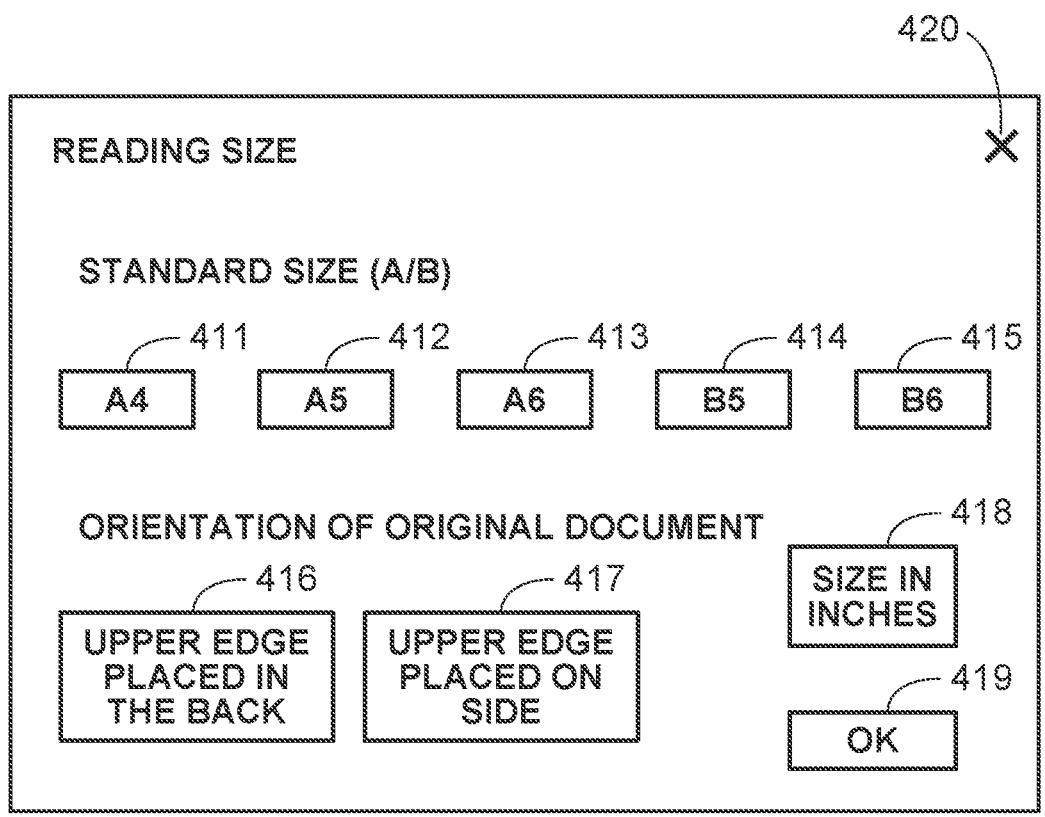
Figure 4C:
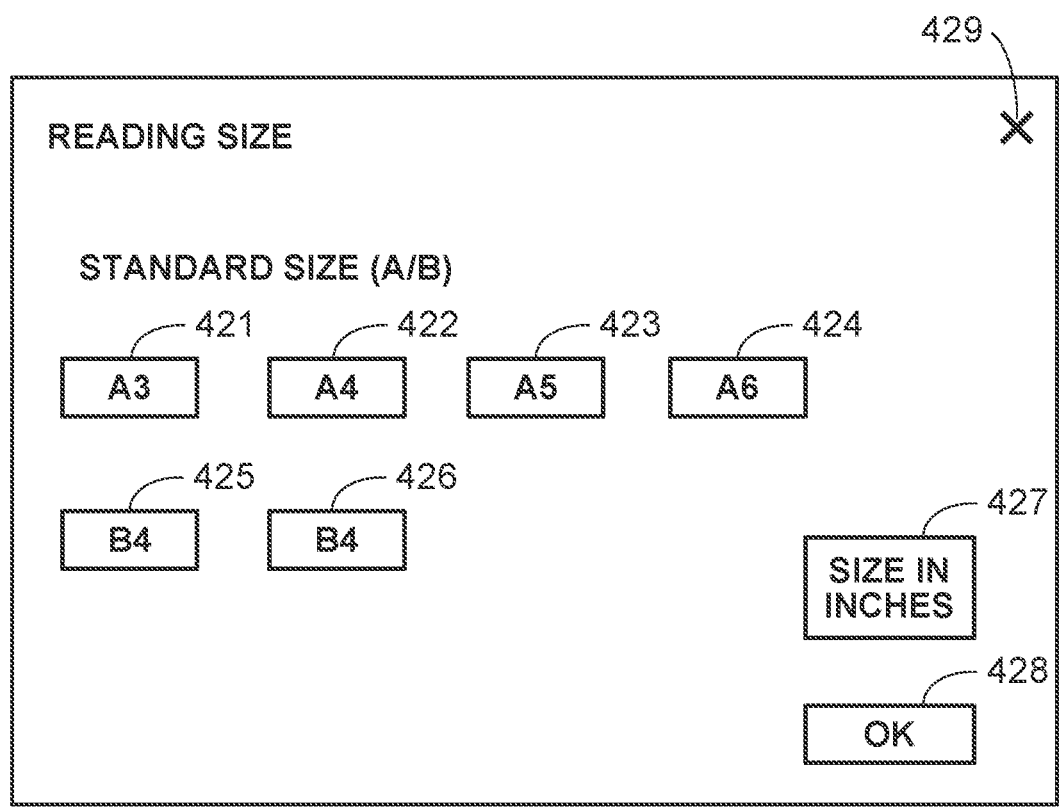

Examples of the setting screen are shown in FIGS. 4A, 4B, and 4C.

FIG. 4A is a diagram illustrating an example of a setting screen of a reading size of a document.

The setting screen in FIG. 4A corresponds to an example of a setting screen in which an automatic size detection button 401, a user defined size button 402, and a button 403 for closing the setting screen are displayed, and the OK button (button for finalizing the selection) is not displayed. The setting screen of FIG. 4A corresponds to an example of a setting screen in which one setting item (only setting of document size) is displayed and a close button is displayed. It should be noted that on the screen shown in FIG. 4A, there are two options for the setting item "document size". The selection finalization unit 206 performs setting finalization processing by using the selected one option. More specifically, the selection finalization unit 206 finalizes the setting by the one button operation.

FIG. 4B is a diagram illustrating an example of a setting screen for setting a reading size of a document that requires a plurality of selections.

The setting screen in FIG. 4B corresponds to an example of a setting screen on which standard size setting buttons 411 to 415, document orientation setting buttons 416 and 417, a button 418 for switching to inch size setting, an OK button 419 for finalizing the setting, and a button 420 for closing the setting screen are displayed. That is, the setting screen of FIG. 4B corresponds to an example of a setting screen in which there are a plurality of setting items (here, setting of a document size and setting of a document orientation), and an OK button and a close button are displayed.

FIG. 4C is a setting screen of the reading size of the document after the scan start button is pressed.

The setting screen of FIG. 4C corresponds to an example of a setting screen on which standard size setting buttons 421 to 426, a button 427 for switching to inch size setting, an OK button 428 for finalizing selection, and a button 429 for closing the setting screen are displayed. The setting screen in FIG. 4C corresponds to an example of a setting screen in which one setting item (only setting of the document size), an OK button, and a close button are displayed. In the above-described setting screen in FIG. 4A, even if the selection is finalized, the job (here, "scan") using the selected setting is not immediately started. However, the setting screen in FIG. 4C is a setting screen after the scan start button is pressed, and therefore, when the selection is finalized, a job (scan) using the selected setting is started immediately.

Hereinafter, selection finalization processing on the setting screen will be described with reference to FIGS. 4A to 4C and FIG. 5.

FIG. 5 is a flowchart illustrating an example of the selection finalization processing on the setting screen according to the first embodiment. Here, it is assumed that after the selection is finalized, the setting screen display unit 201 performs processing for closing the setting screen, and the screen displayed before the setting screen was displayed is displayed. However, the present disclosure does not limit the processing to processing after the selection is finalized, and processing such as displaying a dialog notifying that the selection is confirmed may be performed.

In step S501, the setting screen display unit 201 determines whether there is an OK button on the setting screen being displayed. In a case where the OK button is not displayed on the setting screen (NO in step S501), the control shown in steps S502 to S504 and step S511 is executed by each functional unit shown in FIG. 2.

If NO in step S501, when the option button is pressed on the setting screen, in step S502, the button pressing reception unit 203 detects pressing of the option button. In a case where pressing of the option button is detected, in step S503, the pressed button identification unit 204 identifies the option button pressing of which has been detected in step S502.

When the pressed option button is identified, in step S504, the selection finalization unit 206 finalizes the selection of the button identified in step S503 and finalizes the setting corresponding to the selection. For example, in a case where one of the automatic size detection button 401 and the user defined size button 402 is pressed on the setting screen in FIG. 4A, the selection is finalized, and the setting corresponding to the selection is finalized.

When the setting is finalized, in step S511, the setting screen display unit 201 closes the setting screen.

On the other hand, in a case where the OK button is displayed on the setting screen (YES in step S501), the control shown in steps S505 to S509 and S512 is executed by each functional unit shown in FIG. 2.

If YES in step S501, when a button is pressed on the setting screen, in step S505, the button pressing reception unit 203 detects pressing of the button. When pressing of the button is detected, in step S506, the pressed button identification unit 204 identifies the type of the pressed button.

In a case where the pressed button is an option button (NO in step S506), in step S507, the pressed button identification unit 204 identifies the pressed option button.

When the button of the pressed option is identified, in step S508, the selection information storage unit 207 stores the option identified in step S507 as the option being selected. In addition, the setting screen display unit 201 displays the option identified in the above-described step S507 in the selected state, transitions to step S505, and the button pressing reception unit 203 monitors pressing of the button.

On the other hand, in a case where the pressed button is the OK button (YES in step S506), in step S509, the selection finalization unit 206 finalizes the setting corresponding to the option stored as the selected option in the selection information storage unit 207. For example, on the setting screen in FIG. 4B, the user selects desired settings from the standard size setting buttons 411 to 415 and the document orientation setting buttons 416 and 417, and then presses the OK button 419 for finalizing the settings, thereby finalizing the selection of the standard size option and the document orientation option, and finalizing the settings corresponding to the selection.

When the settings are finalized, in step S512, the setting screen display unit 201 closes the setting screen.

A selection cancellation process will be described below with reference to FIGS. 6 and 7.

Figure 6:
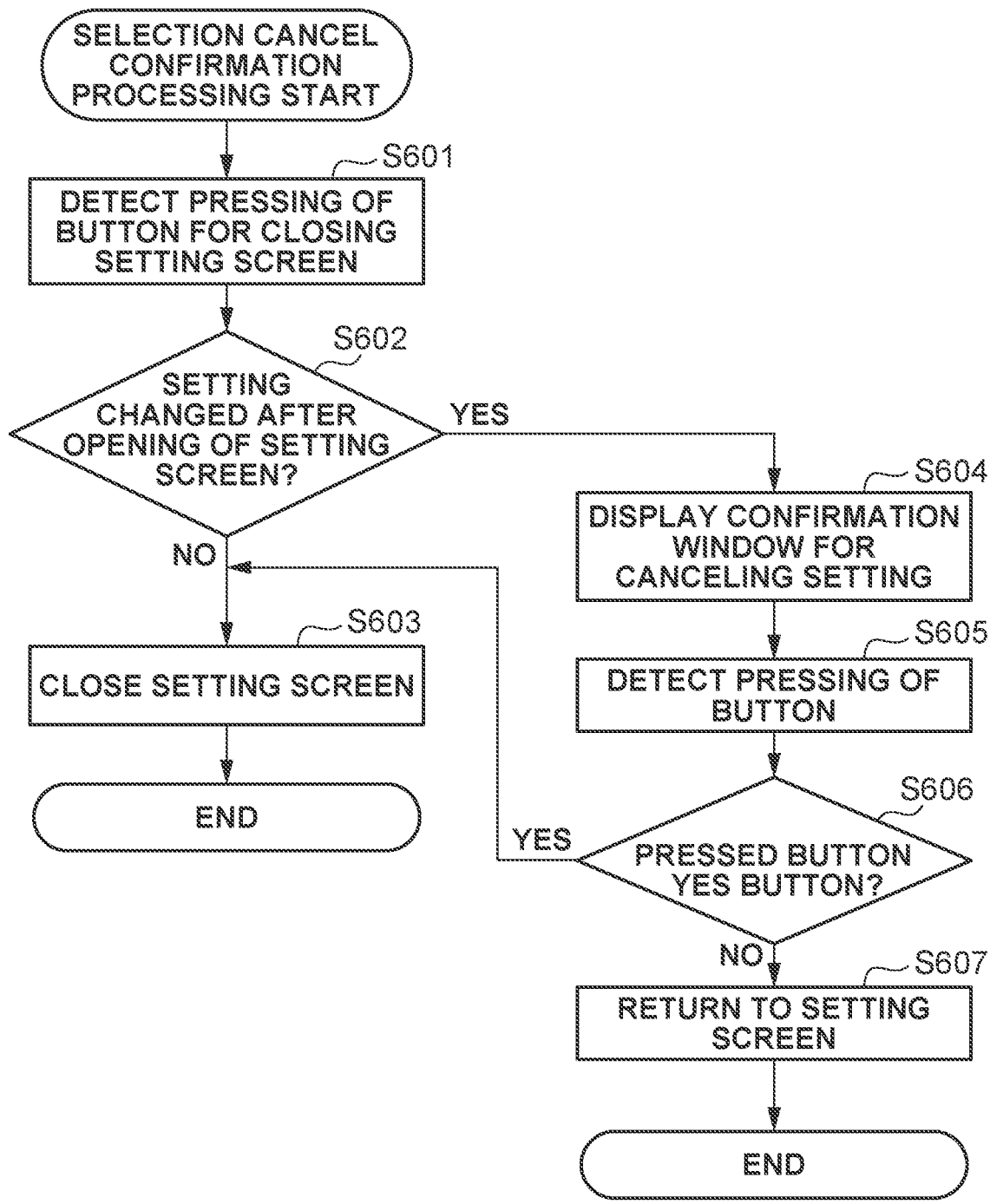
FIG. 6 is a flowchart of a process for confirming selection cancellation.

FIG. 6 is a flowchart illustrating an example of a process of cancelling a selection on a setting screen.

When the button for closing the setting screen is pressed, in step S601, the button pressing reception unit 203 detects pressing of the button. At this time, the pressed button identification unit 204 identifies the setting screen associated with the close button that has been pressed.

When the pressing of the close button is detected, in step S602, the selection information storage unit 207 determines whether the selection has been changed since opening of the setting screen. This determination is executed based on whether the currently selected option stored in association with the setting screen in the selection information storage unit 207 has been changed. In the setting screen in which the OK button is not displayed, since the selection is finalized by the selection of the option and the setting screen is closed, it is always determined as NO in step S602.

If the selection has not been changed since opening of the setting screen (NO in step S602), in step S603, the setting screen display unit 201 closes the setting screen.

In the setting screen in which the OK button is displayed, if the setting is changed after the screen is opened (YES in step S602), in step S604, the confirmation window display unit 202 displays a confirmation window for confirming that the selection is canceled.

Figure 7:
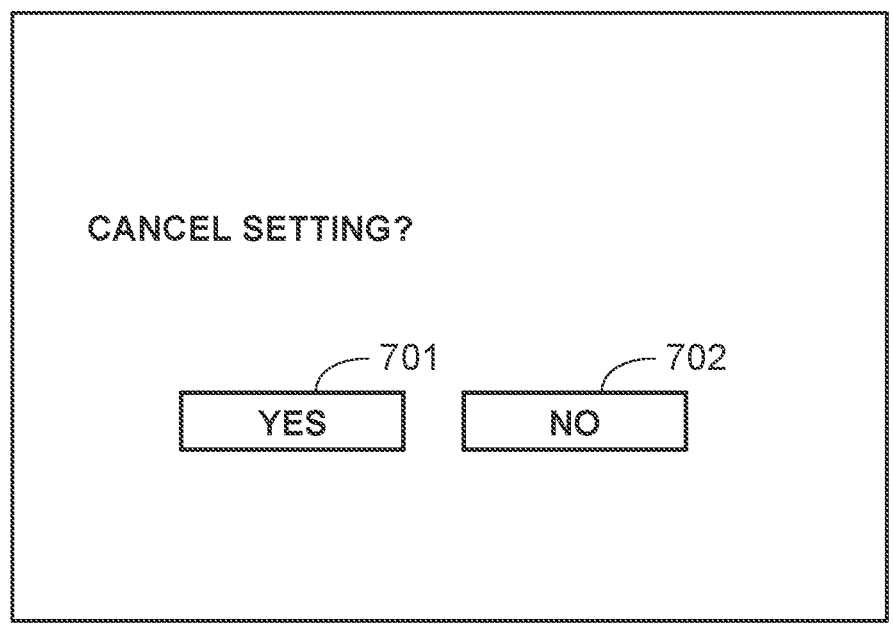
FIG. 7 is a display example of a confirmation window for selection cancellation.

FIG. 7 is a diagram illustrating an example of a confirmation window for confirming cancellation of the selection.

In the example of FIG. 7, a YES button 701 for accepting cancellation of selection and a NO button 702 for returning to the setting screen are displayed on the confirmation window.

When a button is pressed on the confirmation window, in step S605, the button pressing reception unit 203 detects pressing of the button. At this time, the pressed button identification unit 204 identifies the pressed button.

When the pressed button is identified, in step S606, the selection finalization unit 206 determines whether the button detected to be pressed is the YES button 701 for approving cancellation of selection or the NO button 702 for returning to the setting screen. When either button is pressed, the confirmation window display unit 202 closes the confirmation window.

In a case where the pressed button is YES button 701 for approving cancellation of selection (YES in step S606), it is determined that the selection on the setting screen is cancelled, and in S603, the setting screen display unit 201 closes the setting screen.

On the other hand, in a case where the pressed button is the NO button 702, for returning to the setting screen (NO in step S606), in S607, the setting screen display unit 201 returns controlling to the setting screen and receives the button pressing on the setting screen again. That is, the setting screen is not closed (the display of the setting screen is continued), the selection on the setting screen is not canceled, and the button pressing on the setting screen is acceptable again.

In the setting screen in which it is determined that the predetermined software key (OK button) for finalizing the selection is not necessary as a result of performing the processing described above, the OK button is not displayed, and the setting is finalized by a one button operation. In this way, the number of operations can be reduced, and usability can be improved. In addition, in the setting screen in which it is determined that the OK button for finalizing the setting is necessary, the OK button is displayed, and the selection is finalized by pressing the OK button, thereby preventing a decrease in usability. Even on a screen on which the same setting is performed, it is possible to prevent a decrease in usability and improve usability by switching between display and non-display of a button for finalizing selection according to a situation.

In the first embodiment, in the setting screen in which it is determined that the OK button for finalizing the selection is unnecessary, the selection is finalized by the one button operation, and in the setting screen in which it is determined that the OK button for finalizing the selection is necessary, the selection is finalized by pressing the OK button.

However, in a second embodiment, the means for finalizing the selection need not be the OK button.

In the second embodiment, in the case of a setting screen on which an OK button is not displayed and it is determined that means for finalizing selection is necessary, the selection is finalized by the following control. That is, a confirmation window for confirming the finalization of the selection is displayed after the pressing of the option button is detected on the setting screen, and the selection is finalized when the user presses the button for finalizing the selection on the confirmation window. The difference between the present embodiment and the first embodiment is that there is no display of an OK button on the setting screen, and selection finalization processing in the case of a setting screen for which it is determined that the means for finalizing selection is necessary. In the present embodiment, steps S301, S302, and S304 are executed as the setting screen display processing. As for the selection finalization processing, the processing shown in FIGS. 8A and 8B is used instead of the processing in FIG. 5.

Hereinafter, the selection finalization processing according to the present embodiment will be described with reference to FIGS. 8A, 8B, and 9.

Figure 8A:
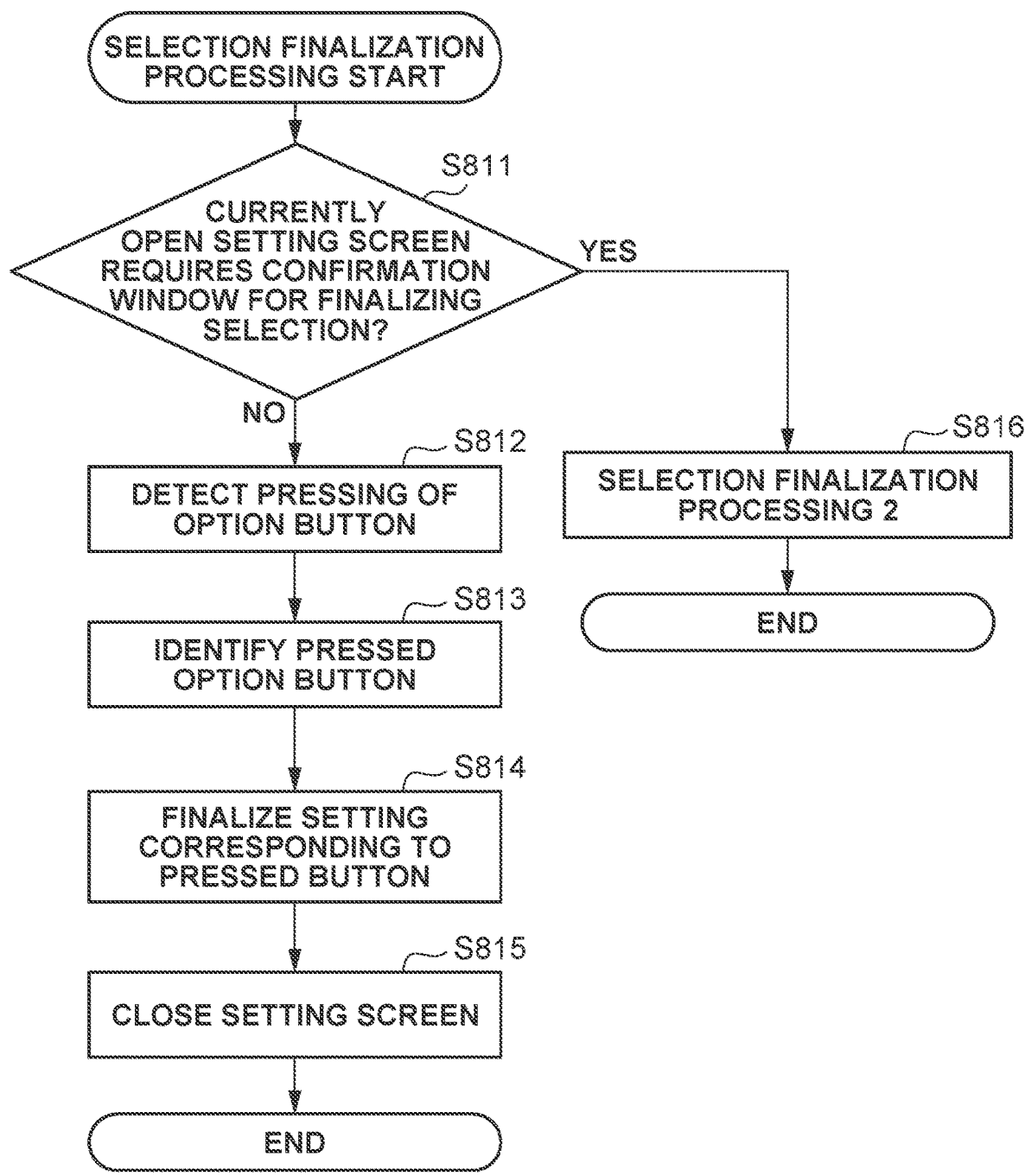
FIG. 8A is a flowchart illustrating processing for finalizing a selection according to a second embodiment.
Figure 8B:
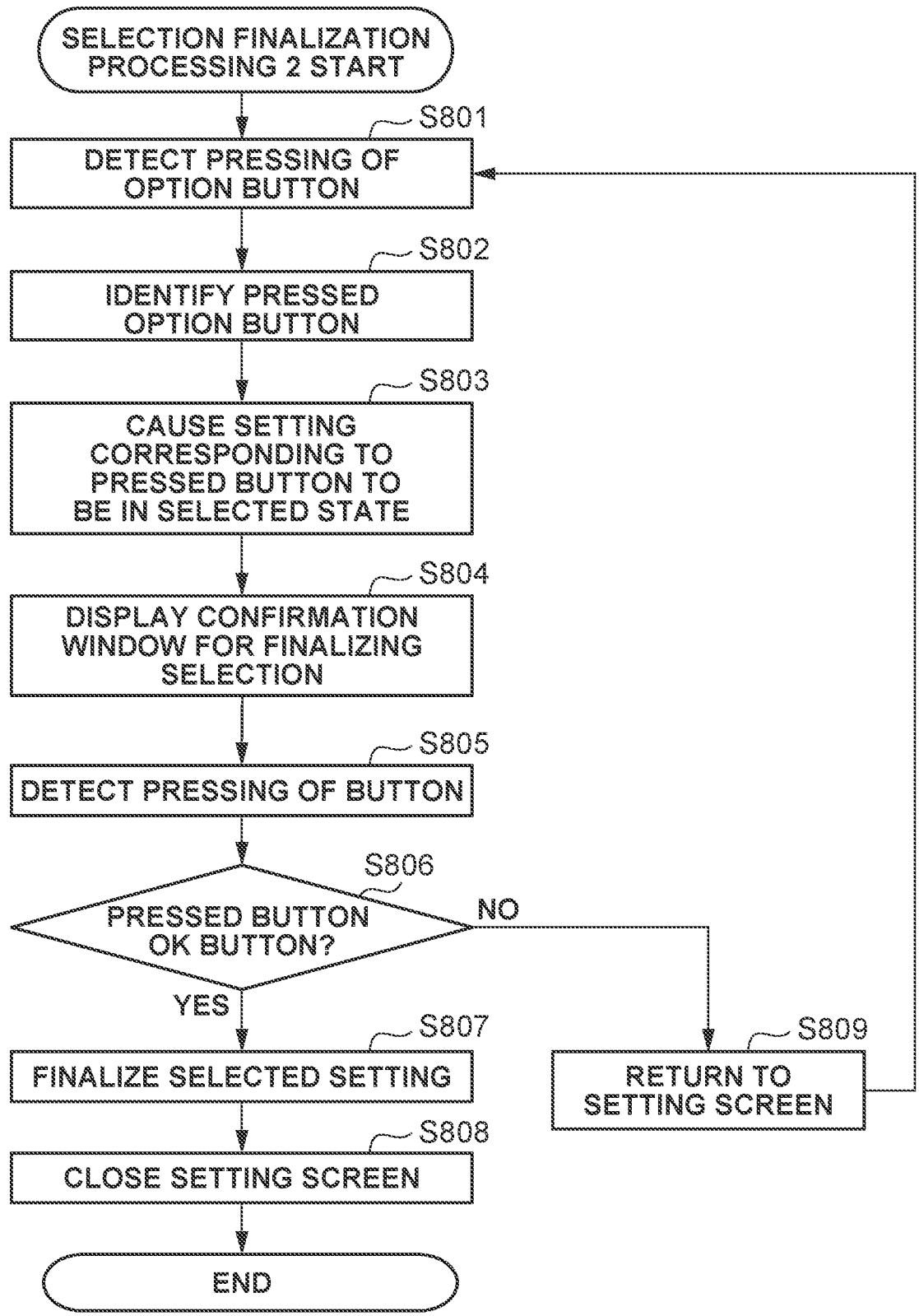
FIG. 8B is a flowchart illustrating processing for finalizing a selection according to the second embodiment.

FIG. 8A and FIG. 8B are flowcharts illustrating an example of the selection finalization processing on the setting screen according to the second embodiment. Each step of the flowcharts shown in FIGS. 8A and 8B is processed by the CPU 100 of the image processing apparatus 1 executing a program. The program to be executed is called from the ROM 104 and causes each functional unit shown in FIG. 2 to function. In the drawings, "S" indicates a step.

Selection Finalization Processing According to Second Exemplary Embodiment

In step S811 in FIG. 8A, the setting screen display unit 201 determines whether a confirmation window for finalization of selection is necessary in the setting screen being displayed. Similar to step S303 in FIG. 3, this determination is made based on the state and operation status of the image processing apparatus 1. In a situation where it is determined NO in step S303, it is determined NO in step S811, and in a situation where it is determined YES in step S303, it is determined YES in step S811.

In a case where the confirmation window for finalization of selection is not necessary (NO in step S811), the control shown in steps S811 to S815 is executed by each functional unit shown in FIG. 2. Processing in steps S811 to S815 is the same processing as that in steps S502 to S504 and step S511, and thus description thereof is omitted.

On the other hand, in a case where the confirmation window for finalization of selection is necessary (YES in step S811), the control shown in selection finalization processing 2 in step S816 (FIG. 8B) is executed by each functional unit shown in FIG. 2. The selection finalization processing 2 will be described below with reference to FIG. 8B.

Selection Finalization Processing 2

In a case where an option button is pressed on the setting screen, in step S801, the button pressing reception unit 203 detects pressing of the option button. When pressing of the option button is detected, in step S802, the pressed button identification unit 204 identifies the option button whose pressing is detected in step S801.

When the pressed option button is identified, in step S803, the selection information storage unit 207 stores the option button identified in step S802 as an option being selected. Further, the setting screen display unit 201 displays the option button identified in step S802 in the selected state.

Further, in step S804, the confirmation window display unit 202 displays a window for confirming the finalization of the selection.

Figure 9:
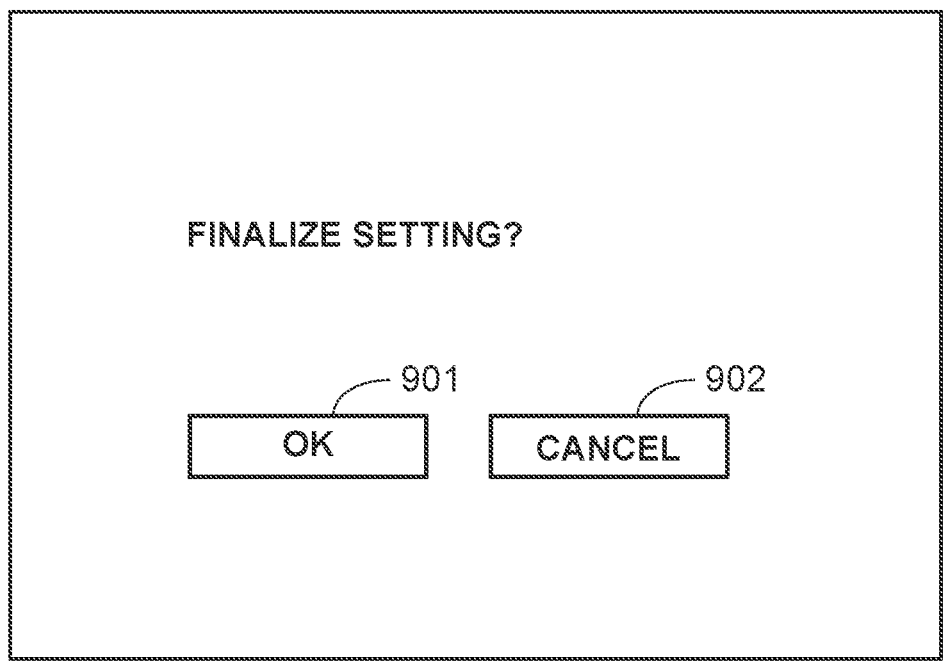
FIG. 9 is a display example of a screen for confirming selection finalizing according to the second embodiment.

FIG. 9 is a diagram illustrating an example of a confirmation window for confirming finalization of selection.

In the example of FIG. 9, an OK button 901 for finalizing the selection and a cancel button 902 for returning to the setting screen are displayed on the confirmation window.

When a button is pressed on the confirmation window, in step S805, the button pressing reception unit 203 detects pressing of the button. At this time, the pressed button identification unit 204 identifies the pressed button.

When pressing of the button is detected, in step S806, the selection finalization unit 206 determines whether the detected button is the OK button 901 for finalizing the selection, or the cancel button 902 for returning to the setting screen. When either button is pressed, the confirmation window display unit 202 closes the confirmation window.

In a case where the pressed button is the OK button 901 for finalizing the selection (YES in step S806), in step S807, the selection finalization unit 206 finalizes the setting corresponding to the option stored as the selected option in the selection information storage unit 207.

Further, in step S808, the setting screen display unit 201 closes the setting screen.

On the other hand, in a case where the pressed button is the cancel button 902 for returning to the setting screen (NO in step S806), in step S809, the setting screen display unit 201 returns controlling to the setting screen to enable reception of button pressing on the setting screen again, transitions to step S505, and the button pressing reception unit 203 monitors button pressing.

As described above, in the second embodiment, since the selection is finalized by displaying the confirmation window instead of displaying the OK button in the first embodiment, it is possible to more carefully finalize the selection.

For example, this is effective in a situation where it is not easy to correct the selection, such as a setting screen after pressing a start button as shown in FIG. 4C.

Although the case where the present disclosure is applied to the image processing apparatus has been described above, the present disclosure is not limited to application to the image processing apparatus, and is applicable to control related to setting screens of a personal computer (PC), a tablet terminal, a smartphone, various electronic devices, and home appliances.

As described above, according to each embodiment, it is possible to achieve both maintenance of usability and reduction of the number of operations in an operation of a setting screen for selecting one from a plurality of options, and it is possible to greatly improve operability.

The configurations and content of the various types of data described above are not limited thereto, and it is needless to say that the various types of data may be configured with various configurations and content according to applications and purposes.

While the embodiments have been described above, the present disclosure can be embodied as, for example, a system, an apparatus, a method, a program, or a storage medium. Specifically, the present disclosure may be applied to a system including a plurality of devices, or may be applied to an apparatus including a single device.

All configurations obtained by combining the above-described embodiments are also included in the present disclosure.

In addition, the present disclosure may be applied to a system including a plurality of devices or an apparatus including one device.

According to the present disclosure, it is possible to further improve operability.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-140880, filed Sep. 5, 2022, which is hereby incorporated by reference herein in its entirety.

What is claimed is:

1. A print control apparatus comprising:
at least one memory and at least one processor which function as:
a display control unit configured to perform control so as to display a first setting screen including a first plurality of options for a predetermined setting item and a second setting screen including a second plurality of options for the predetermined setting item, the first setting screen being for setting a setting value for the predetermined setting item by receiving a selection operation for one of the first plurality of options and the second setting screen being for setting a setting value for predetermined setting item by receiving a selection operation for one of the second plurality of options, wherein the second plurality of options include at least one option that is not included in the first plurality of options; and
a control unit configured to
in a first case, perform first control of finalizing a setting value to be set for the predetermined setting item to a setting value corresponding to an option for which the selection operation has been received in response to reception of the selection operation for the option displayed on the first setting screen, wherein the first setting screen is only for the predetermined setting item, and
in a second case, perform second control of finalizing a setting value to be set for the predetermined setting item to a setting value corresponding to an option for which the selection operation is received in response to reception of the selection operation of a specific software key after reception of the selection operation for the option displayed on the second setting screen without finalizing the setting value to be set for the setting item to the setting value corresponding to the option for which the selection operation is received at a time when the selection operation for the option displayed on the second setting screen is received.

2. The print control apparatus according to claim 1, wherein the control unit is configured to perform the first control in the first case where the specific software key is not displayed, and
wherein the control unit is configured to perform the second control in the second case where the specific software key is displayed.

3. The print control apparatus according to claim 2, wherein the display control unit controls whether to display the software key to be displayed in accordance with the setting screen to be displayed or the setting screen to be displayed and a state of the print control apparatus.

4. The print control apparatus according to claim 3, wherein the display control unit performs control such that the specific software key is displayed on the second setting screen, wherein the second setting screen includes options respectively corresponding to a plurality of setting items.

5. The print control apparatus according to claim 4, wherein the first print setting is a setting screen only for the predetermined setting item.

6. The print control apparatus according to claim 1, wherein the display control unit displays a first confirmation window for confirming whether to cancel selection of the option by the selection operation in a case where, after the selection operation of the option is performed on the second setting screen on, an operation of closing the second setting screen is performed without performing an operation on the specific software key, and
wherein the control unit closes the second setting screen in a case where a cancel operation is received on the first confirmation window without finalizing the setting value corresponding to the option, and displays the second setting screen without canceling the selection of the option in a case where an operation not to cancel the selection is received on the first confirmation window.

7. The print control apparatus according to claim 1, wherein the at least one memory and the at least one processor further function as an output unit configured to print and output an image on a sheet.

8. The print control apparatus according to claim 1, further comprising a scanner configured to execute scan processing for reading a document, wherein the setting value is used for scanning a document by the scanner.

9. The print control apparatus according to claim 1, wherein the predetermined setting item is a print setting item regarding a scan function.

10. The print control apparatus according to claim 9, wherein the predetermined setting item relates to a reading size of a document.

11. A control method for a print control apparatus, comprising:

performing control so as to display a first setting screen including a first plurality of options for a predetermined setting item and a second setting screen including a second plurality of options for the predetermined setting item, the first setting screen being for setting a setting value for the predetermined setting item by receiving a selection operation for one of the first plurality of options and the second setting screen being for setting a setting value for the predetermined setting item by receiving a selection operation for one of the second plurality of options, wherein the second plurality of options include at least one option that is not included in the first plurality of options;

in a first case, finalizing a setting value to be set for the predetermined setting item to a setting value corresponding to an option for which the selection operation has been received in response to reception of the selection operation for the option displayed on the first setting screen, wherein the first setting screen is only for the predetermined setting item; and in a second case, finalizing a setting value to be set for the predetermined setting item to a setting value corresponding to the option for which the selection operation has been received in response to reception of the selection operation of a specific software key after reception of the selection operation for the option displayed on the second setting screen without finalizing the setting value to be set for the setting item to the setting value corresponding to the option for which the selection operation is received at a time when the selection operation for the option displayed on the second setting screen is received.

12. A non-transitory computer-readable storage medium storing a program for executing a method for controlling a print control apparatus, the method comprising:

performing control so as to display a first setting screen including a first plurality of options for a predetermined setting item and a second setting screen including a second plurality of options for the predetermined setting item, the first setting screen being for setting a setting value for the predetermined setting item by receiving a selection operation for one of the first plurality of options and the second setting screen being for setting a setting value for the predetermined setting item by receiving a selection operation for one of the second plurality of options, wherein the second plurality of options include at least one option that is not included in the first plurality of options;

in a first case, finalizing a setting value to be set for the predetermined setting item to a setting value corresponding to an option for which the selection operation has been received in response to reception of the selection operation for the option displayed on the first setting screen; and in a second case, finalizing a setting value to be set for the predetermined setting item to a setting value corresponding to the option for which the selection operation has been received in response to reception of the selection operation of a specific software key after reception of the selection operation for the option displayed on the second setting screen without finalizing the setting value to be set for the setting item to the setting value corresponding to the option for which the selection operation is received at a time when the selection operation for the option displayed on the second setting screen is received.

* * * * *